United States Patent [19]

Okada et al.

[11] Patent Number: 5,895,110
[45] Date of Patent: Apr. 20, 1999

[54] LCD VIDEO PROJECTOR

[75] Inventors: Takehiro Okada, Ibaraki; Shozo Aono, Takatsuki; Masanari Hashimukai, Ibaraki; Makoto Hoshino, Takatsuki; Takanobu Taniyama, Ibaraki, all of Japan

[73] Assignee: Matsushita Electric Industrial Co., Ltd., Osaka, Japan

[21] Appl. No.: 08/984,800

[22] Filed: Dec. 4, 1997

[30] Foreign Application Priority Data

Dec. 6, 1996 [JP] Japan ............................. 326401/1996

[51] Int. Cl.$^6$ .............................. G03B 21/00; G03B 3/00
[52] U.S. Cl. ................................................. 353/31; 353/101
[58] Field of Search ............................. 353/31, 33, 47, 353/69, 70, 71, 100, 101; 359/694, 46, 48

[56] References Cited

U.S. PATENT DOCUMENTS

| | | | |
|---|---|---|---|
| 4,606,628 | 8/1986 | Vance | 353/101 |
| 4,998,135 | 3/1991 | Hyodo | 355/56 |
| 5,285,287 | 2/1994 | Shikama | 348/745 |
| 5,396,301 | 3/1995 | Ssaki et al. | 348/794 |
| 5,599,083 | 2/1997 | Mort | 353/69 |
| 5,642,927 | 7/1997 | Booth et al. | 353/119 |

FOREIGN PATENT DOCUMENTS

| | | |
|---|---|---|
| 5-21246 | 1/1993 | Japan . |
| 5-27324 | 2/1993 | Japan . |
| 5-40309 | 2/1993 | Japan . |
| 8-129227 | 5/1996 | Japan . |
| 8-160488 | 6/1996 | Japan . |

*Primary Examiner*—Safet Metjahic
*Assistant Examiner*—Hung Henry Nguyen
*Attorney, Agent, or Firm*—Ratner & Prestia

[57] ABSTRACT

A nut 13 is provided on a holding board 9 of a barrel 8 housing a projection lens. At both sides of a holding base 11 are supporting plates 12 having a stepping shape for presenting a sliding gap, and the holding board 9 is inserted in the sliding gap. At an upper corner of the holding base 11 is a pivot pedestal 14, and a shift rod 15 is attached revolvable to the pivot pedestal 14, the shift rod 15 having a screw portion 16 that engage with the nut 13. The projection lens moves up and down driven via nut 13 by revolution of the shift rod 15, for the height adjustment of projection lens.

5 Claims, 8 Drawing Sheets

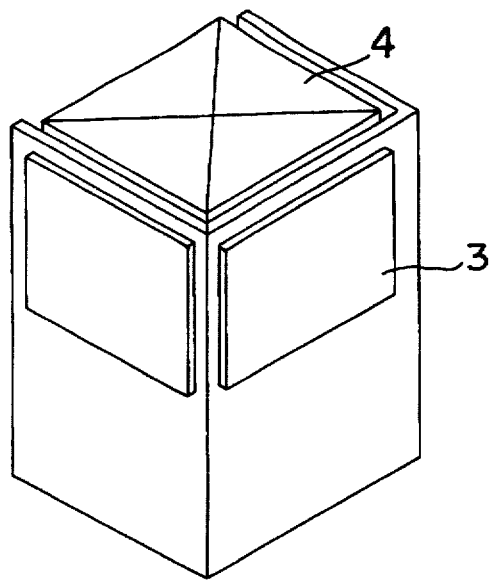
F I G. 5
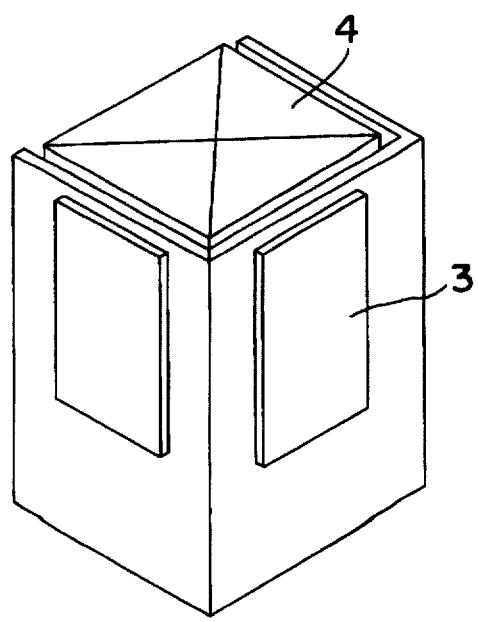
F I G. 6

LCD VIDEO PROJECTOR

BACKGROUND OF THE INVENTION

The present invention relates to an LCD (Liquid Crystal Display) video projector for projecting an image in LCD panel enlarged on a screen, more specifically, an LCD video projector that can move the location of a projected picture by shifting the standing of projection lens up and down.

There have been an LCD video projector for magnifying and projecting an image in LCD panel on a screen using a metal halide lamp, etc. as a light source. In such projector, the light from a light source is concentrated through a mirror or such other devices on an LCD panel, and an image existing in the LCD panel is projected through a projection lens on a screen.

Normally in an LCD video projector, the center of LCD panel is located on the optical axis of projection lens, hence a picture is projected on a screen with its center and the optical axis of projection lens met. The video projector is usually placed on a flat horizontal plane such as a desk top, however, because a preferred positioning of projected picture is usually higher than the desk top, the video projector is often uplifted in its front part by, for example, extending front feet of the video projector. A drawback with the above described arrangement is that a projected picture is distorted to a trapezium shape. A means to solve the above drawback is to design a projection apparatus so as to be able to shift the optical axis of projection lens relative to the center axis of LCD panel, and project an image with the respective axes dislocated from each other.

Prior art mechanism's for shifting the optical axis of lens are illustrated in FIGS. 8–10. FIG. 8 is a perspective view of such a mechanism disclosed in the Japanese Patent Laid-open No.5-27324. In which mechanism, a condenser lens 52 and a projection lens 53 mounted on an arm 54 may be moved up and down by turning a screw shaft 55. The optical axis is thus shifted from the center axis of an LCD panel.

FIG. 9 is a side view of such a mechanism disclosed in the Japanese Utility Model Laid-open No.5-21246. In which mechanism, a projection lens 61 is mounted on a pantograph pedestal supported with an operation link 62 and a link 63, and the projection lens 61 is moved up and down while being kept in parallel by turning a gear 64 engaged with the operation link 62.

FIG. 10 is a side view of such a mechanism disclosed in the Japanese Patent Laid-open No.8-160488. In which mechanism, a lens barrel 71 is moved up and down by revolving a pinion 72 of a motor attached to the lens barrel 71, the pinion 72 being engaged with straight line gear teeth 74 on a rack 73.

Problems with these prior art LCD video projector having above described types of lens moving mechanism include a complexity and bulkiness of the lens moving mechanism, a large number of assembly parts and components needed for the lens moving mechanism as well as a high manufacturing cost coming therefrom, also a not-quite-satisfactory operational convenience. In the case of FIG. 8, for example, two shafts have to be revolved synchronized by a gear transmission, which means that a precise position setting is not quite easy, and it requires a rather complicated mechanism occupying a bulky space. In the case of FIG. 9, the link portion readily causes a play, which results in a difficulty of focusing. The span of up and down motion is limited because of the pantograph structure. In the case of FIG. 10, in which a motor and a gear wheel are integrated, space for housing the motor, etc. and manufacturing cost are the drawbacks.

Along with the increasing use of LCD video projector, voices have become louder for a new LCD video projector that is compact and easy, as well as comfortable, to use.

SUMMARY OF THE INVENTION

The present invention aims to present an LCD video projector having a simplified lens moving mechanism, yet it offers some operational convenience.

An LCD video projector of the present invention comprises a light source, a group of mirrors for splitting/mixing chromatic light from the light source, an LCD panel for controlling the transmission of chromatic light, a projection lens for enlarging and projecting an image of light transmitted from the LCD panel, a lens barrel for holding the projection lens and having a nut thereon, a holding member for holding the lens barrel to slide up and down, a shift rod attached revolvable on the holding member and engaged with the nut, and a cabinet embracing the light source, the group of mirrors, the LCD panel, the projection lens, the lens barrel, the holding member and the shift rod, provided with a hole at a place corresponding to an end of the shift rod. The projection lens moves up and down along with revolution of the shift rod.

The LCD video projector has a lens moving mechanism that is quite simple and compact; in which a projection lens slides up and down as a result of revolution of the shift rod, the move of which being conveyed via the nut. The LCD projection apparatus has an additional operational convenience in that the projection lens may be moved up and down by taking advantage of the hole provided in the upper part of the cabinet.

In the lens moving mechanism of the above invented projector, it is preferred to attach one shift rod on the holding member on which a prism and the LCD panel are mounted, and a nut on the side of lens barrel. By adopting the above described constitution, the entire dimensions of a video projector may be made still smaller and the ease of operation may be promoted further.

It is preferred to provide a button at the top of the shift rod, which button popping up with a push and sinks with another push. With this constitution, the button may be housed inside a cabinet during the lens sliding work is off, for protection against possible breakage of the button.

The movable range of a projection lens should preferably be not shorter than the minor axis of LCD panel. Under such an arrangement, a picture may be projected in a space that is higher than the level of LCD video projector without uplifting the projector at the front part.

A rectangular LCD panel (a panel having e.g. a 4:3 or 16:9 aspect ratio between the major axis and the minor axis) is usually disposed in a projection apparatus with the major axis horizontal. In the present invention, however, an LCD panel may be disposed with the minor axis horizontal. In this arrangement, a video projector attached to a side wall of a room may project a normal picture on a screen.

BRIEF DESCRIPTION OF THE DRAWINGS

FIG. 5 is a perspective view showing arrangement of an LCD panel in the projector of FIG. 1.

FIG. 6 is a perspective view showing the arrangement of LCD panel when a video projector is attached to a side wall of a room.

DESCRIPTION OF THE PREFERRED EMBODIMENTS (Embodiment 1)

Figure 1A:
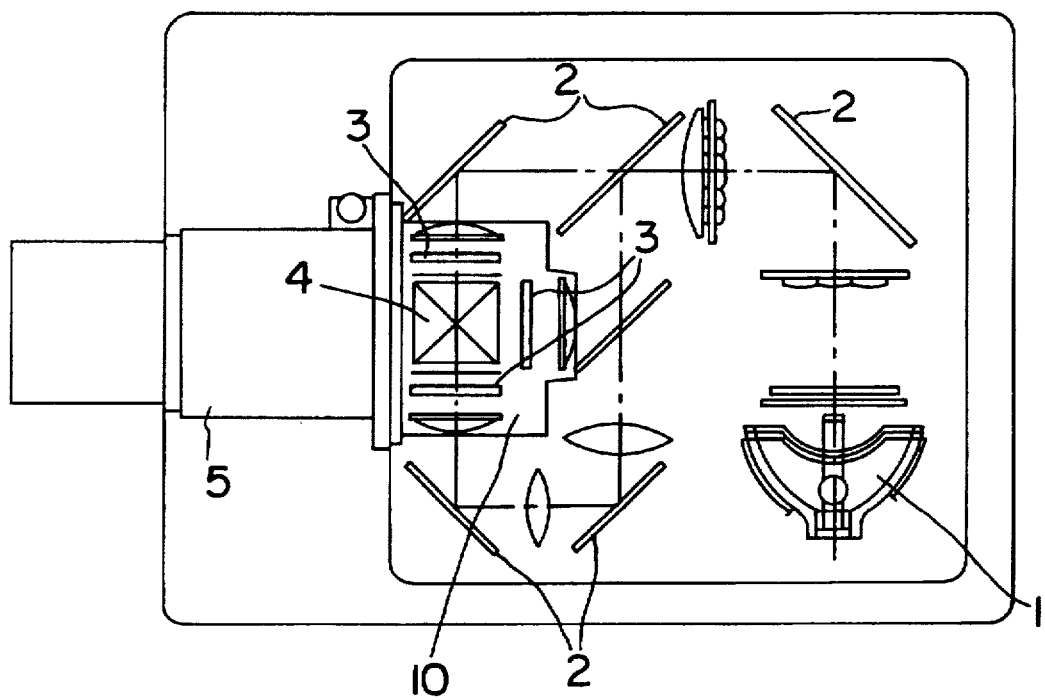
FIG. 1(a) and FIG. 1(b) show conceptual outline of an optical system in an LCD video projector in accordance with an exemplary embodiment of the present invention, a plane view and a front view, respectively.
Figure 1B:
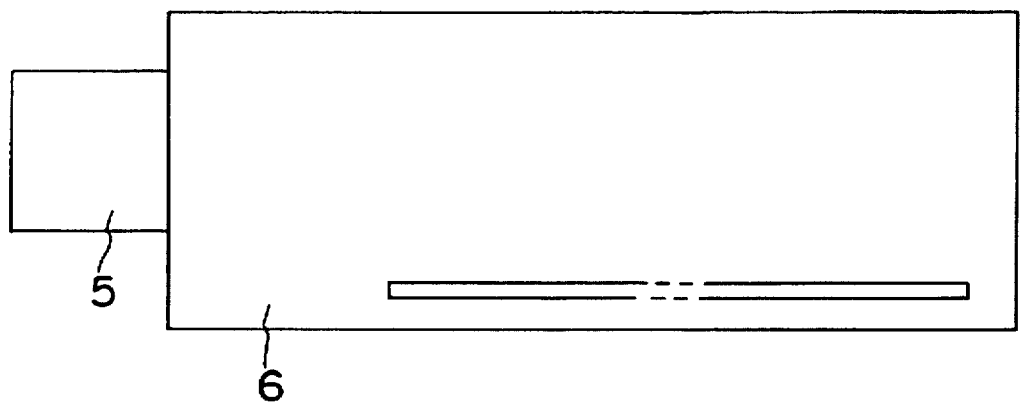
Figure 2:
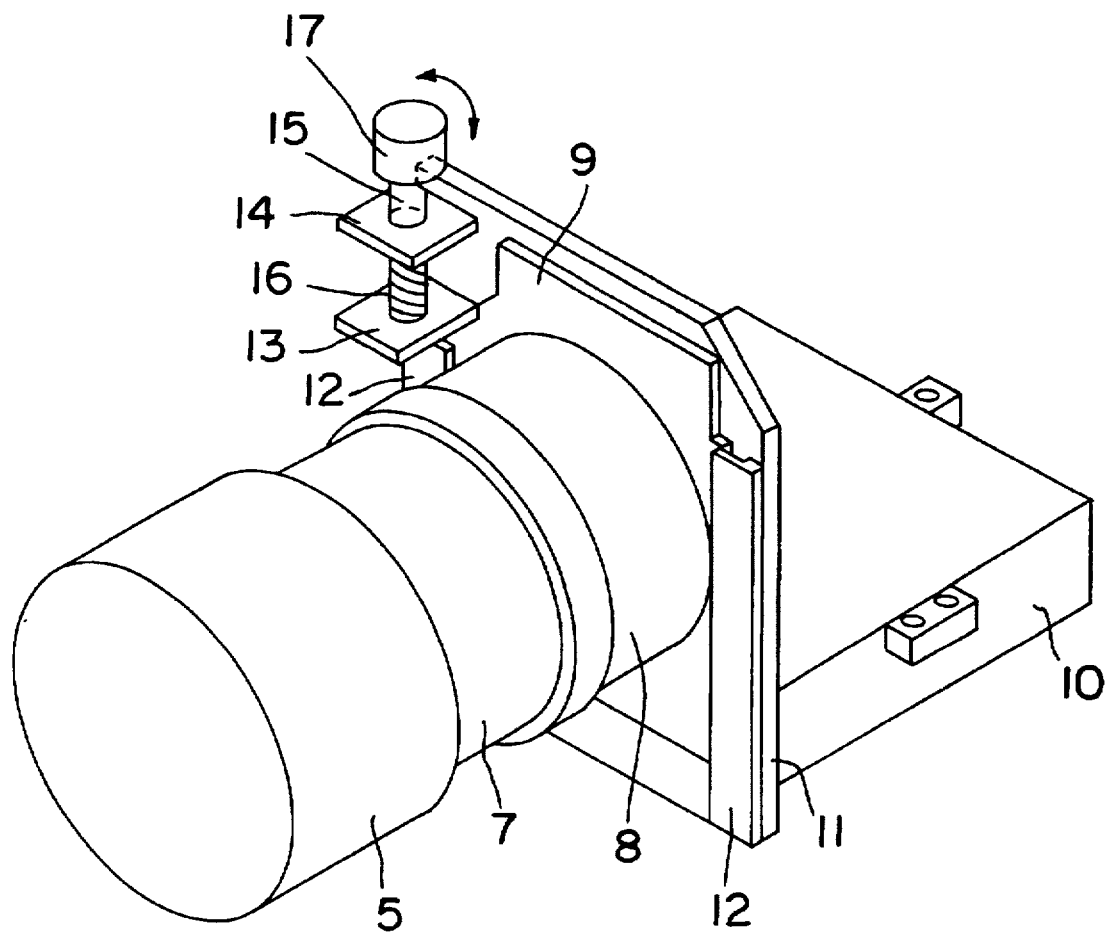
FIG. 2 is a perspective view of lens moving mechanism of the projector of FIG. 1.

Structure of an LCD video projector in accordance with an exemplary embodiment of the present invention is described with reference to drawings. As shown in FIG. 1(a) and FIG. 1(b), the light from a lamp (light source) 1 is split into the three colors, red, green and blue, by a plurality of mirrors 2. The split lights respectively travel to LCD panels 3. Transmission of the respective lights is controlled at each respective LCD panels 3, and then the lights are guided to a prism 4 for composition. The composed light goes to a projection lens system 5, and an image by the light transmitted from the LCD panels 3 is projected enlarged on a screen (not shown). These constituent components are housed in a cabinet 6, and each of the LCD panels 3 is disposed in the outside of respective three side surfaces of the prism 4, as shown in FIG. 5.

The lens moving mechanism of the present video projector moves the projection lens system 5 up and down by making use of the up and down motion of nut 13 caused by a screw portion 16 of shift rod 15. The projection lens system 5 comprises a projection lens (not shown) consisting of a combination of a plurality of unit lenses, and barrels 7 and 8 housing the projection lens. A flat holding board 9 is provided at one end of the outer barrel 8, forming a single-body component together with the barrel 8. The nut 13 is disposed at the vicinity of one of the upper corners of holding board 9. For easier assembly, it is preferred to prepare the barrel 8 and the holding board 9, as well as the nut 13, together as a one-piece component by aluminum die-casting, resin molding or such other methods.

The holding board 9 is fitted slidable up and down into a holding base 11 (holding member) having supporting plates 12, in the right and the left sides, provided with a stepped form for securing a sliding gap. The holding base 11 is fixed to a prism stand 10 forming the shape of a letter L.

Figure 3A:
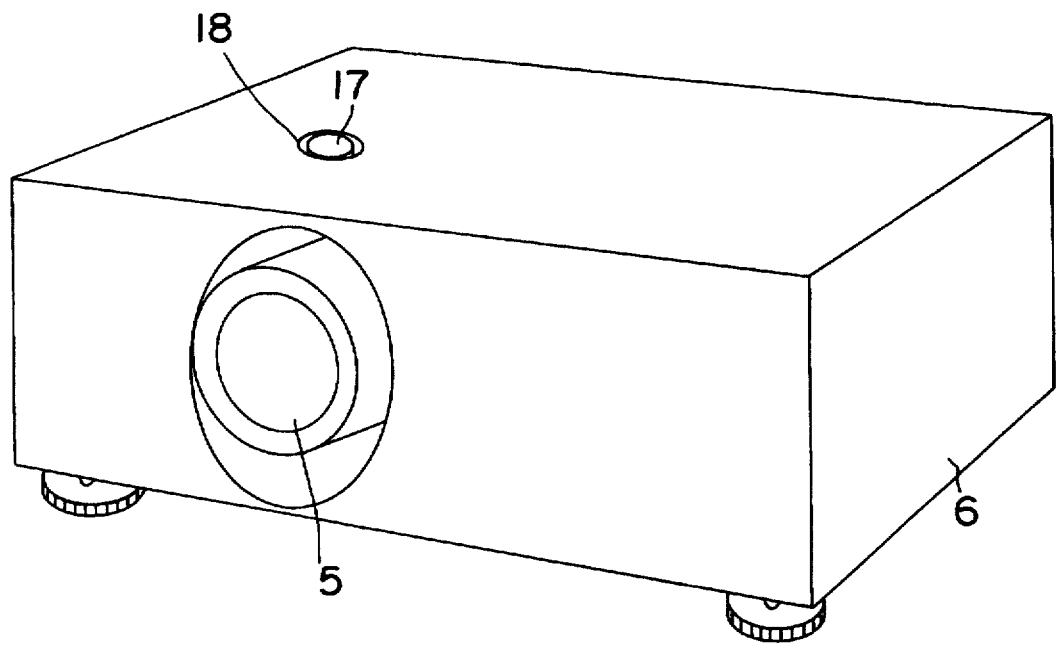
FIG. 3(a) and FIG. 3(b) are perspective views, respectively, of the projector with a turning button sunk and popped up.
Figure 3B:
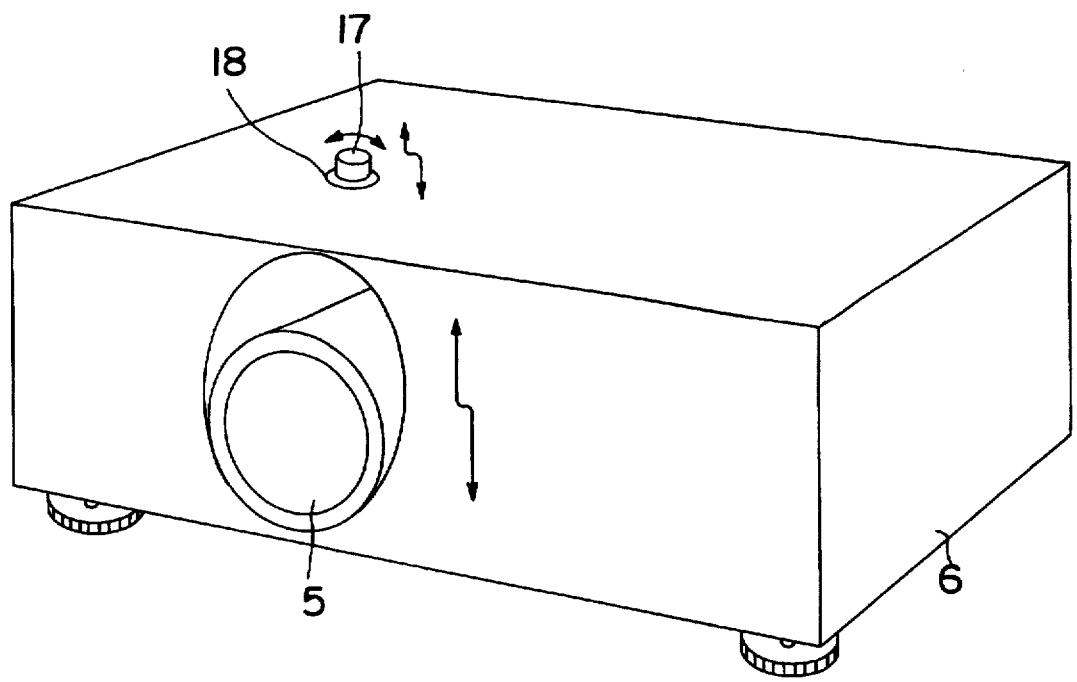

A pivot pedestal 14 is provided at a corner of the holding base 11 corresponding to the position of nut 13, and the shift rod 15 is affixed revolvable to the pivot pedestal 14. In the lower part of shift rod 15, a screw portion 16 is formed to be engaged to nut 13. In the upper part of shift rod 15, a turning button 17 is provided. By turning the turning button 17 the nut 13 moves up and down driven by the screw portion 16; hence, the barrels 7 and 8 move up and down. The turning button 17 is handled through a hole 18 provided in the top board of cabinet 6 at a place corresponding to turning button 17, as shown in FIG. 3(a) and FIG. 3(b).

In the present exemplary embodiment, a push-push type turning button is employed, as a preferred example, for the turning button 17. The push-push type button is a button which pops up at one push and sinks at the next push. When the projection lens does not to be adjusted in the height, the turning button 17 stays at a lowered position as shown in FIG. 3(a), the top surface of the button being almost in the same level as the top surface of cabinet 6. For adjusting the height of projection lens, the turning button 17 is popped up by one push, as shown in FIG. 3(b), which is restored to the lowered position by another push after the adjusting is completed. FIG. 3(b) illustrates a state when the projection lens is moved down.

The basic structure of lens moving mechanism in the present exemplary embodiment is quite a simple and compact one, comprising one short shift rod 16 having a screw portion 16 and a nut 13 provided close to outer surface of barrel 8 which is moved up and down by revolution of the shift rod 15. The use of a push-push type button for the turning button 17 contributes to preventing the occurrence of a possible breakage on the lens moving mechanism during transportation of a video projector. The push-push button is advantageous also from the view point of a good product design.

In view of easier and simpler assembly work, it is preferred to prepare the prism stand 10, the holding base 11 and the supporting plates 12 together as a one-piece component by aluminum die-casting, resin molding or such other methods.

Figure 4A:
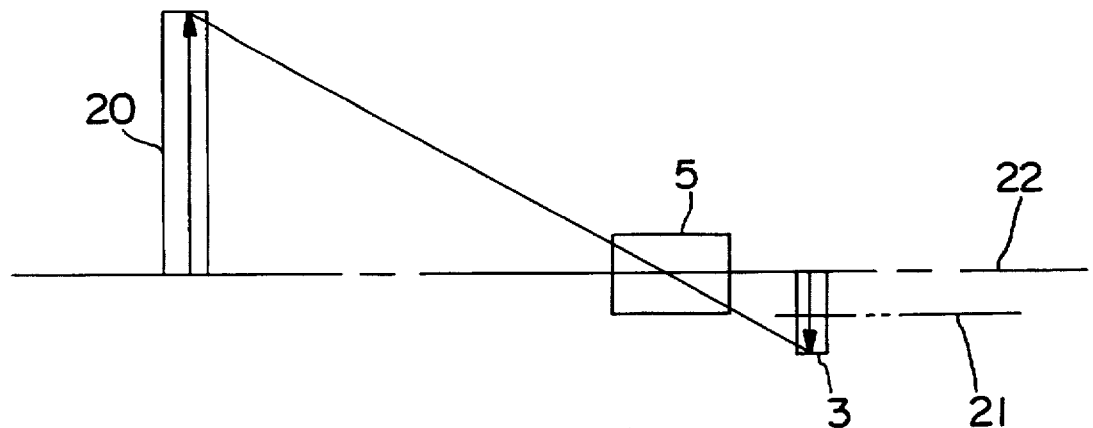
FIG. 4(a) and FIG. 4(b) illustrate the states, respectively, when a projection lens is moved up, and down.
Figure 4B:
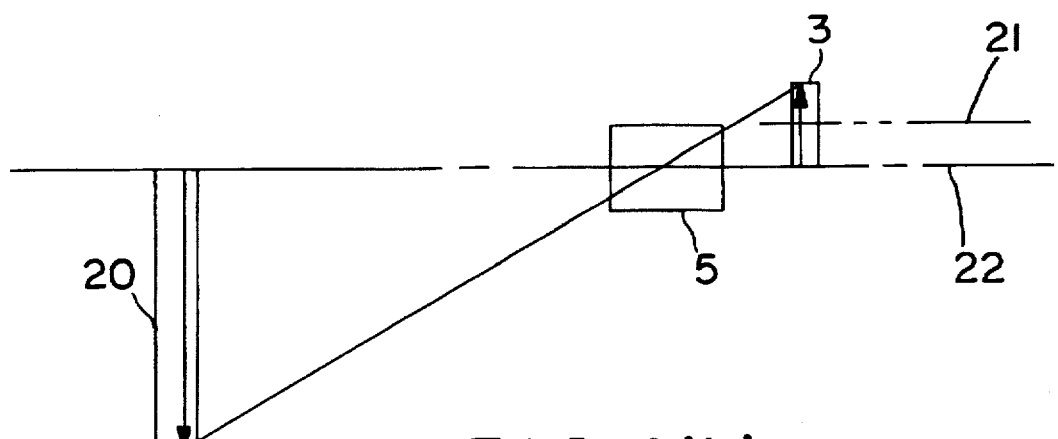

Now the quantity of up and down motion of a projection lens is described in the following. FIG. 4(a) is a side view when a video projector is placed on a desk top or on a floor, where the projection lens system 5 is moved up so as the bottom edge of a projected picture on a screen 20 comes on a same level as the video projector. FIG. 4(b) is a side view when a video projector is suspended from the ceiling, where the projection lens system 5 is moved down so as the top edge of a projected picture on a screen 20 comes to a same height as the projector.

Initially, the optical axis 22 of projection lens system 5 was coincidental with the center axis 21 of LCD panel 3. In the case of FIG. 4(a), the optical axis 22 of projection lens is shifted above the center axis 21 of LCD panel 3 for half the length of minor axis of LCD panel 3. Practically, for a type 1.3-LCD panel having 4:3 aspect ratio (diagonal 33 mm) the quantity of movement 69 is up for half the length of minor axis 19.8 mm, or approximately 10 mm. FIG. 4(b) shows a case opposite to FIG. 4(a), viz. the optical axis 22 is moved down from the center axis 21 for half the length of minor axis (approximately 10 mm).

The optical axis 22 of projection lens in the present exemplary embodiment is designed to be able to move up and down, respectively, for half or more of the length of minor axis of LCD panel 3. Namely, the video projector is designed to provide the optical axis 22 of projection lens with a movable margin not shorter than the length of minor axis of LCD panel 3. In a prior art LCD video projector, where the up and down movable margin given to projection lens is small, uplifting of the projector at the front part is necessary if missing of the bottom edge of a picture on the screen is to be avoided. With a video projector according to the present exemplary embodiment, an entire picture may be projected on a screen without the uplifting at the front part of the video projector, because the projection lens is provided with the up and down movable margin that is not shorter than the length of minor axis of LCD panel; furthermore, the projected picture does not carry with it a trapezoid deformation. Theoretically, there is no limitation in the quantity of movable margin for a projection lens. Practically, however, if the optical axis 22 of projection lens is shifted too far away from the center of LCD panel 21 a projected picture may be distorted. Therefore, the movable distance of a projection lens have to be limited within a certain range in which no distortion is caused on a projected picture, from a practical point of view, the movable distance should preferably be less than three times the minor axis of LCD panel.

(Embodiment 2)

Figure 7:
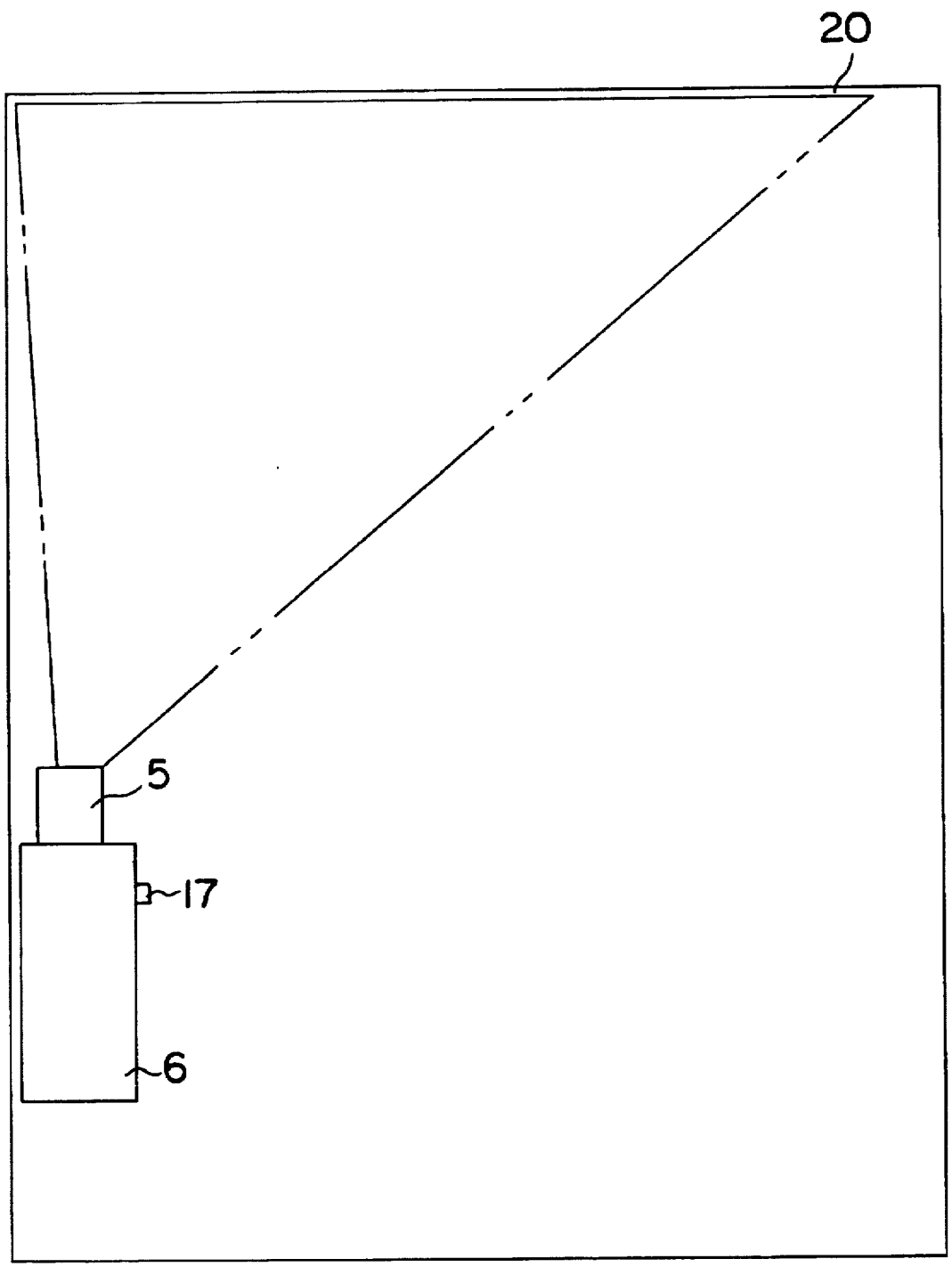
FIG. 7 is a plane view used to explain a state of projection from an LCD video projector attached to a side wall.
Figure 8:
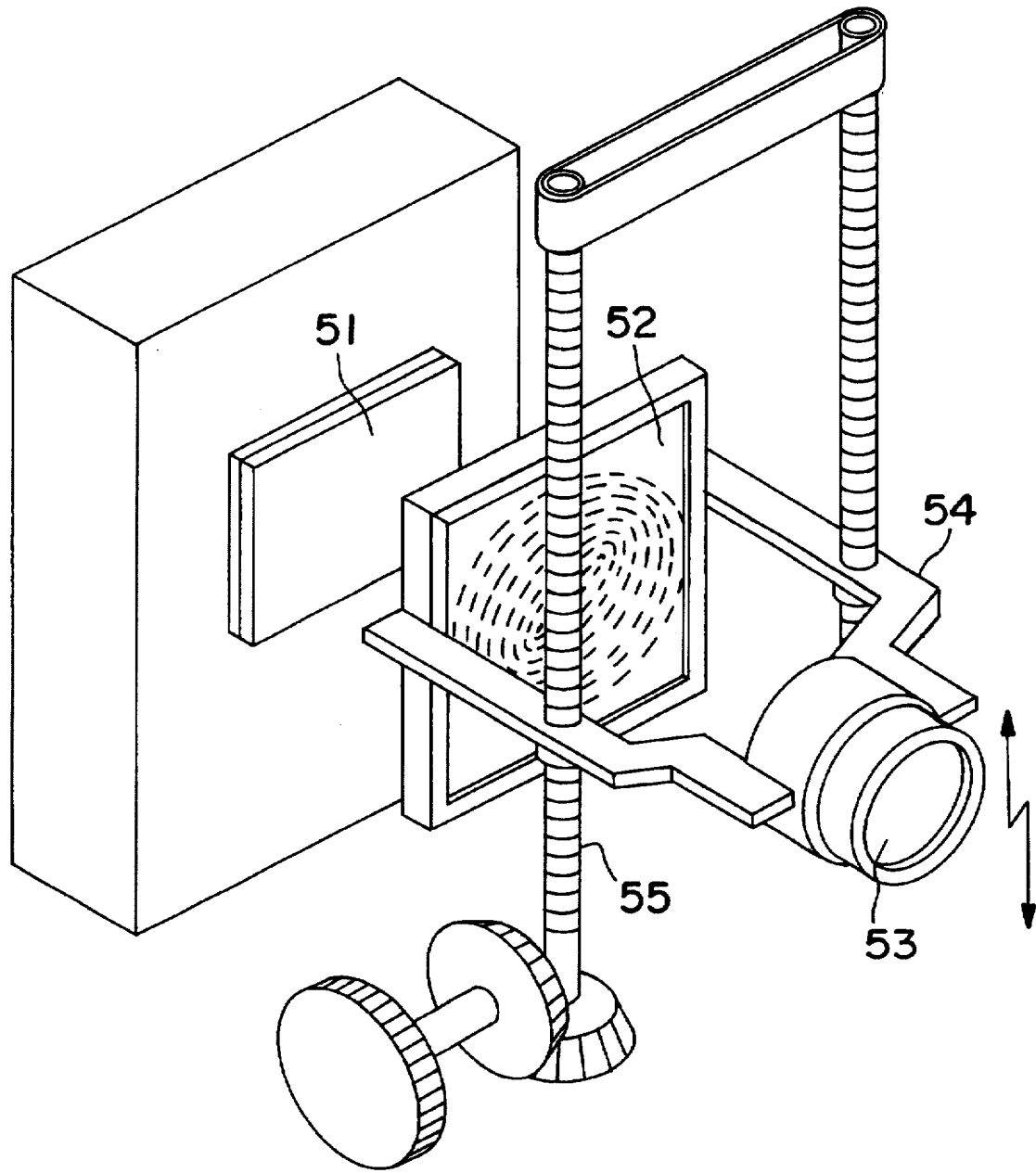
FIG. 8, FIG. 9 and FIG. 10 respectively show prior art lens moving mechanisms.
Figure 9:
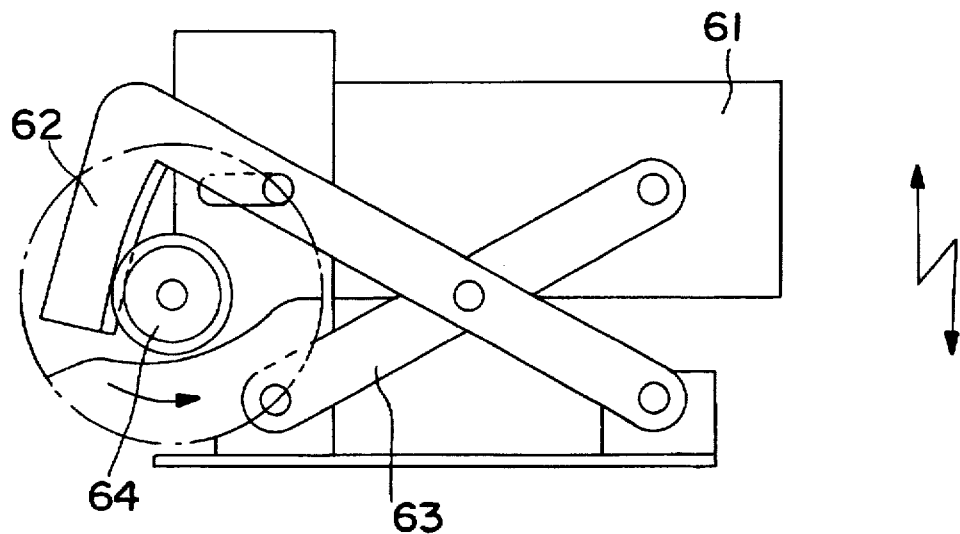
Figure 10:
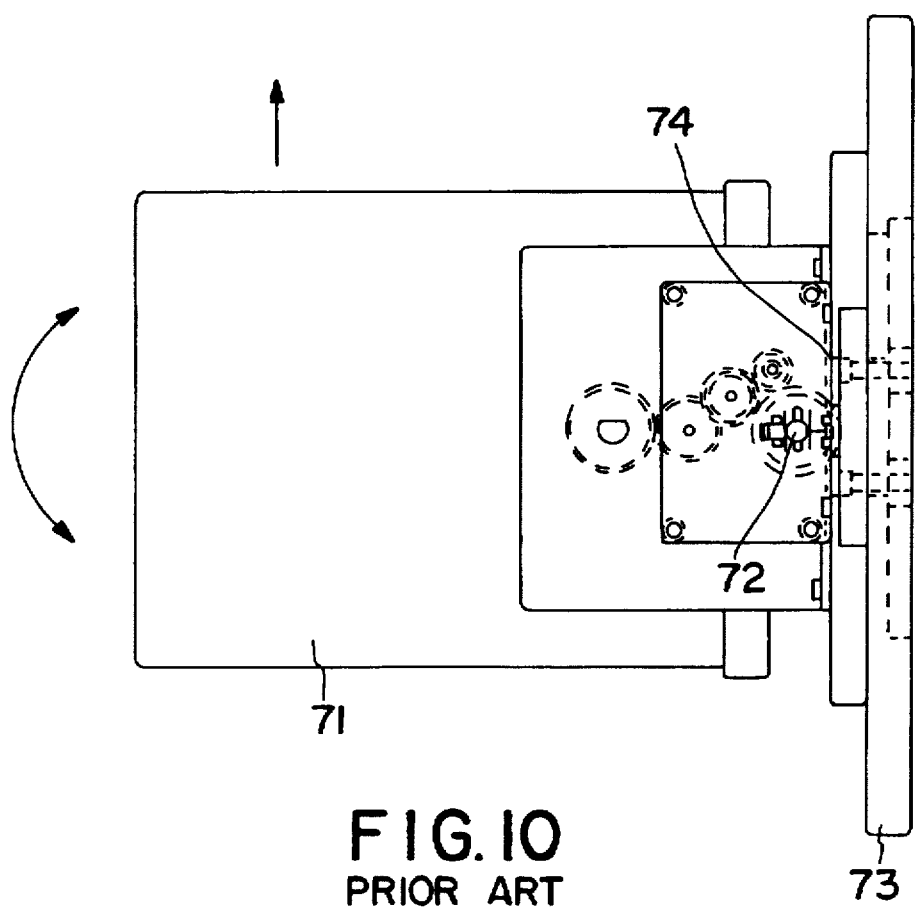

Exemplary embodiment 2 is a modification of the embodiment 1; an LCD video projector that may be attached to a side wall of a room. As shown in FIG. 6, LCD panels 3 in the present embodiment are disposed in an arrangement shifted by 90 degree from that of FIG. 5. This projector is attached to a side wall, as shown in FIG. 7 which is a plane view seen from ceiling, in a manner that a turning button 17 comes to the right, and projection lens system 5 moves right and left. In FIG. 7, the optical axis of projection lens is moved to the right from an initial position where the optical axis of projection lens and the center axis of LCD panel are coincidental.

An LCD projector according to the present exemplary embodiment, attached to a side wall of a room, can project an entire part of an image, without any portion of a projected picture missing from screen, as illustrated in FIG. 7.

As described in the above, an LCD video projector of the present invention comprises a lens moving mechanism of quite a simple and compact structure, through which mechanism an inexpensive and compact projector may be implemented. The LCD video projector may be placed on a desk top, suspended from the ceiling, attached to a side wall or in any other such places. At any mode of installation, the video projector is capable of projecting an entire image, no part of a projected picture missing form a screen, without necessitating the front feet uplifting or such other orientation work on the projector. Thus the LCD video projector is a user-friendly projector.

The present invention can be embodied in various forms, without departing from the spirit or the main feature. For example, although in the above described exemplary embodiments a 3-panel LCD video projector in which three LCD panels are employed is exemplified, the invention may of course be implemented in a single-panel LCD video projector. Accordingly, it is intended that the appended claims be interpreted as covering all alterations and modifications as fall within the true spirit and scope of the invention.

What is claimed is:

1. An LCD video projector comprising:

a light source for generating chromatic light;

a group of mirrors for splitting the chromatic light generated by said light source;

an LCD panel for controlling the transmission of said split chromatic light;

a prism for combining said split chromatic light;

a projection lens for magnifying and projecting light transmitted from said prism;

a barrel for holding said projection lens and provided with a nut;

a holding member for holding said barrel;

a shift rod coupled to said holding member and engaged with said nut; and a cabinet containing said light source, said group of mirrors, said LCD panels, said projection lens, said barrel, said holding member and said shift rod, and provided with a hole at a place corresponding to the top end of said shift rod, wherein said projection lens is moved by revolution of said shift rod.

2. An LCD video projector of claim 1, wherein said shift rod comprises one single rod, and said holding member holds said prism and said LCD panel.

3. An LCD video projector of claim 1, wherein said shift rod is provided with a button which, upon being pushed, alternates between an upward position and a downward position.

4. An LCD video projector of claim 1, wherein said projection lens is movable equal distances from a state where the optical axis of said projection lens and the center axis of said LCD panel are coincidental.

5. An LCD video projector of claim 1, wherein said LCD panel is disposed for installation of said LCD video projector to a side wall of a room.

* * * * *